(12) United States Patent
Huang et al.

(10) Patent No.: US 10,975,487 B1
(45) Date of Patent: Apr. 13, 2021

(54) ELECTROLYTIC COPPER FOIL AND ELECTRODE AND COPPER-CLAD LAMINATE COMPRISING THE SAME

(71) Applicant: CHANG CHUN PETROCHEMICAL CO., LTD., Taipei (TW)

(72) Inventors: Huei-Fang Huang, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/746,054

(22) Filed: Jan. 17, 2020

(30) Foreign Application Priority Data

Dec. 9, 2019 (TW) .................................. 108144933

(51) Int. Cl.
  C25D 7/04 (2006.01)
  C25D 1/04 (2006.01)
  H01M 10/0525 (2010.01)
  H01M 4/66 (2006.01)
  H01M 4/70 (2006.01)

(52) U.S. Cl.
  CPC .............. *C25D 1/04* (2013.01); *H01M 4/661* (2013.01); *H01M 4/667* (2013.01); *H01M 4/70* (2013.01); *H01M 10/0525* (2013.01); *Y10T 428/12431* (2015.01)

(58) Field of Classification Search
  None
  See application file for complete search history.

(56) References Cited

U.S. PATENT DOCUMENTS 6,444,112 B1 * 9/2002 Imada ...................... C25D 1/04
                                                        205/586

FOREIGN PATENT DOCUMENTS

| JP | 2007217791 | 8/2007 |
| JP | 2010018885 | 1/2010 |
| JP | 2016113644 | 6/2016 |
| JP | 2016135917 | 7/2016 |
| JP | 2017014608 | 1/2017 |
| JP | 2017526115 | 9/2017 |
| KR | 20130027484 A | 3/2013 |
| KR | 20190007705 A | 1/2019 |
| TW | 201807260 | 3/2018 |
| TW | 201832628 | 9/2018 |
| WO | WO2017217085 | 12/2017 |
| WO | WO2018181726 | 6/2019 |

OTHER PUBLICATIONS

Liang et al., "Effect of grain structure on Charpy impact behavior of copper", Mar. 2017, Scientific Reports, pp. 1-11 (Year: 2017).*
An Office Action of the related Taiwan application No. 108144933 dated Apr. 24, 2020.

(Continued)

*Primary Examiner* — Seth Dumbris
(74) *Attorney, Agent, or Firm* — WPAT, PC

(57) ABSTRACT

Provided are an electrolytic copper foil, and an electrode and a copper-clad laminate comprising the same. The electrolytic copper foil comprises a base copper layer having a drum side and a deposited side; wherein the electrolytic copper foil has a Charpy impact strength from 0.4 J/mm² to 5.8 J/mm².

18 Claims, 5 Drawing Sheets

(56) References Cited

OTHER PUBLICATIONS

Japan Patent Office "Notice of Reasons for Refusal" dated Oct. 16, 2020, Japan.
Examination Report of KR10-2020-0018930 dated Jan. 1, 2021 by Korean Patent Office.
Wenbo Qin et al. "Superior impact property and fracture mechanism of a multilayered copper/bronze laminate", Apr. 29, 2019. Materials Letters 250 (2019) 60-63, Elsevier B.V.

* cited by examiner

ELECTROLYTIC COPPER FOIL AND ELECTRODE AND COPPER-CLAD LAMINATE COMPRISING THE SAME

CROSS-REFERENCE TO RELATED APPLICATION

Pursuant to 35 U.S.C. § 119(a), this application claims the benefit of the priority to Taiwan Patent Application No. 108144933 filed on Dec. 9, 2019. The content of the prior application is incorporated herein by its entirety.

BACKGROUND

1. Field of the Disclosure

The present disclosure relates to an electrolytic copper foil, more particular to an electrolytic copper foil for lithium ion batteries or printed circuit boards. In addition, the present disclosure also relates to an electrode and a copper-clad laminate comprising the same.

2. Description of the Prior Arts

Copper foils have an excellent electric conductivity and cost lower than precious metals such as silver; therefore, the copper foils are widely used not only in basic industries, but also as an important raw material for advanced technology industries. For example, the copper foils can be used as a material for electrically connecting individual components of a circuit board and as a basic material of a copper-clad laminate, both of which are applied to the electronic industry in fields such as smart phones and notebook computers. In addition, the copper foils also can be used as a material for electrodes of lithium-ion batteries (LiBs), which are applied to portable electronic devices (PED) and electric vehicles (EVs).

With the ever-increasing demand for miniaturization and weight reduction of the electronic and electrical devices, a demand for reducing the thickness of the copper foils contained therein also have been raised. Therefore, characteristics and qualities of the copper foils have a more significant impact on the performance of the electronic and electrical devices. For example, when the copper foils have wrinkles, some situations such as an uneven coating or a breakage are prone to occur in the folds of the copper foils in subsequent manufacturing processes or applications. In the case that aforesaid copper foils having wrinkles are applied to a lithium ion battery, the active materials attached thereon may peel off from the surface of the copper foils during a repetitive charging and discharging process of the lithium ion battery since there is a lack of good bonding between the copper foils and the active materials. In the case that aforesaid copper foils having wrinkles are applied to printed circuit boards (PCB), the etching solution may penetrate into the folds of the copper foils to cause a disconnection of the circuit.

SUMMARY OF THE DISCLOSURE

In view that the conventional copper foil has technical defects, an objective of the instant disclosure is to reduce or even avoid the generation of wrinkles on the surface of the electrolytic copper foil, thereby improving a production yield thereof in subsequent applications.

To achieve the foresaid objective, the instant disclosure provides an electrolytic copper foil comprising a base copper layer; wherein a Charpy impact strength of the electrolytic copper foil ranges from 0.4 J/mm² to 5.8 J/mm².

By means of controlling the range of the Charpy impact strength of the electrolytic copper foil, the electrolytic copper foil can specifically improve the mechanical properties and obtain an excellent wrinkle resistance, thereby reducing or even avoiding the occurrence of wrinkles and breakage of the electrolytic copper foil, and then the production yield thereof will be improved.

The impact strength refers to a resistance of an object subjected to an impact force, expressed in terms of the amount of energy absorbed per unit area right before fracture. Those of ordinary skill in the art would recognize that the impact strength of the instant disclosure is different from other mechanical properties such as a tensile strength and a yield strength. The Charpy impact strength of the electrolytic copper foil cannot be deduced from the tensile strength and/or the yield strength of the conventional electrolytic copper foil.

In accordance with the instant disclosure, the impact strength of the electrolytic copper foil is measured by a Charpy impact test using a specimen without a notch. Preferably, the Charpy impact strength of the electrolytic copper foil ranges from 0.5 J/mm² to 5.3 J/mm². More preferably, the Charpy impact strength of the electrolytic copper foil ranges from 0.6 J/mm² to 4.9 J/mm². Even more preferably, the Charpy impact strength of the electrolytic copper foil ranges from 1.0 J/mm² to 4.5 J/mm². Specifically, the Charpy impact strength of the electrolytic copper foil may range from 1.5 J/mm² to 4.0 J/mm², or the Charpy impact strength of the electrolytic copper foil may range from 2.0 J/mm² to 3.5 J/mm².

In accordance with the instant disclosure, the base copper layer of an electrolytic copper foil may be the bare copper foil which is usually manufactured by supplying an electrolyte solution including copper ions between an anode and a cathode drum and applying a direct current between the anode and the cathode drum to make the copper ions of the electrolyte solution electrodeposited on the surface of the cathode drum. The electrolyte solution contains sulfuric acid and copper sulfate as main components, the anode is made from an insoluble metal and called dimensionally stable anode (DSA), and the cathode drum is a titanium-made drum having a polished surface. As the base copper layer accumulates to a predetermined thickness, the base copper layer is peeled off from the surface of the cathode drum and rolled up in a continuous process. One side of the base copper layer which contacts the cathode drum is called the drum side, and the other side of the base copper layer is called the deposited side.

In order to improve the functions of the electrolytic copper foil such as anti-corrosion, conductivity maintenance, adhesion to the active materials or dielectric materials, heat resistance and chemical resistance, the base copper layer of the electrolytic copper foil may be subjected to at least one appropriate surface treatment, and then the electrolytic copper foil will comprise at least one surface-treated layer, which is formed on at least one of the drum side and the deposited side of the base copper layer. In one embodiment, when the electrolytic copper foil comprises one surface-treated layer (i.e. a first surface-treated layer), the surface-treated layer is disposed on either the drum side or the deposited side. In another embodiment, when the electrolytic copper foil comprises two surface-treated layers (i.e. a first surface-treated layer and a second surface-treated layer), the surface-treated layers are respectively disposed on both of the drum side and the deposited side.

Specifically, the side(s) of the base copper layer may be subjected to any one or two or more kinds of surface treatments such as a nodule treatment (also called roughing treatment), a copper covering treatment, a passivation treatment, an anti-corrosion treatment and a silane coupling treatment. Therefore, the obtained surface-treated layer may comprise a nodule treated layer, a copper covering layer, a nickel layer, a zinc layer, an anti-corrosion layer, and a silane coupling layer, but it is not limited thereto. In some embodiments, the obtained surface-treated layer comprises a nodule treated layer and further comprises at least one sub-layer formed on the nodule treated layer; and the at least one sub-layer is selected from the group consisting of: a copper covering layer, a nickel layer, a zinc layer, a chromium layer, and a silane coupling layer.

In terms of the nodule treatment, at least one of the drum side and the deposited side of the base copper layer will be subjected to the nodule treatment; or the outer surface of other surface-treated layer(s) also may be subjected to the nodule treatment. Said surface after the nodule treatment will have many fine undulations, and the shapes of the fine undulations may be a spherical shape, a needle shape, or a plate shape, but it is not limited thereto.

The nodule treatment may be one electrodeposition process by using metal cations such as copper, nickel, chromium, and zinc to form a nodule layer with a single-layer structure. Or, the nodule treatment may be a series of electrodeposition processes by sequentially using different metal cations such as copper, nickel, chromium, and zinc to form a nodule layer with a multi-layer structure. In addition, the nodule treatment can also be processed by a mechanical abrasion or a chemical micro-etching, but it is not limited thereto.

In some embodiments, the outer surface of the nodule treated layer may be processed with a copper covering treatment following the nodule treatment as needed, and therefore the surface-treated layer further comprises a copper covering layer.

In terms of the passivation treatment, at least one of the drum side and the deposited side of the base copper layer will be subjected to the passivation treatment; or the outer surface of other surface-treated layer(s) also may be subjected to the passivation treatment. For example, the outer surface of the nodule layer or the copper covering layer may be subjected to the passivation treatment. Specifically, when zinc metal or zinc alloy is adopted for the passivation treatment, the zinc layer contained in the surface-treated layer will be obtained. In addition, when nickel metal or nickel alloy is adopted for the passivation treatment, the nickel layer contained in the surface-treated layer will be obtained. The obtained passivation layer can improve the chemical resistance of the electrolytic copper foil comprising the same.

In terms of the anti-corrosion treatment, at least one of the drum side and the deposited side of the base copper layer will be subjected to the anti-corrosion treatment; or the outer surface of other surface-treated layer(s) also may be subjected to the anti-corrosion treatment. For example, the outer surface of the nodule layer, the copper covering layer or the passivation layer may be subjected to the anti-corrosion treatment. The anti-corrosion treatment may be an organic anti-corrosion treatment using an azole compound or the like, and then the obtained anti-corrosion layer will be an organic anti-corrosion layer. The anti-corrosion treatment may also be an inorganic anti-corrosion treatment using a chromium-containing material or the like, and then the obtained anti-corrosion layer will be an inorganic anti-corrosion layer. Specifically, the anti-corrosion treatment may be applied by any conventional method; for example, the method may be dip coating, spraying, plating or the like, so the anti-corrosion element will attach to the desired surface.

Examples of the azole compound comprise a triazole-based compound such as triazole, benzotriazole, tolyltriazole, carboxybenzotriazole, chloro-substituted benzotriazole, 3-amino-1,2,4-triazole, 4-amino-1,2,4-triazole, or the derivatives thereof; a thiazole-based compound such as thiazole, isothiazole, 2-amino-4-methylthiazole, or the derivatives thereof; or an imidazole-based compound such as imidazole, 2-mercapto-1-methylimidazole, 1-(2-hydroxyethyl)-2-methylimidazole, 1-(2-chloroethyl)-2-methylimidazole, 2-aminobenzimidazole, or the derivatives thereof. The organic anti-corrosion treatment can use at least one of the foresaid azole compounds.

Examples of the chromium-containing material comprise chromic (VI) acid, chromium oxide, chromate, or dichromate (VI), which can provide a chromium in trivalent form, Cr (III), or hexavalent form, Cr(VI). In some embodiments, the chromium-containing material may be chromium trioxide ($CrO_3$).

In terms of the silane coupling treatment, at least one of the drum side and the deposited side of the base copper layer will be subjected to the silane coupling treatment; or the outer surface of other surface-treated layer(s) also may be subjected to the silane coupling treatment. For example, the outer surface of the nodule layer, the copper covering layer, the passivation layer, or the anti-corrosion layer may be subjected to the silane coupling treatment. Therefore, the silane coupling layer of the surface-treated layer will be obtained.

The silane coupling treatment adopts a silane coupling agent. The silane coupling agent may comprise, but is not limited to, a compound represented by the chemical formula: $Y—(R')_n—Si(OR)_3$; wherein Y is selected from the group consisting of: a glycidyl group (i.e. epoxy group), an amino group, an epoxycyclohexyl group, an uramino group (i.e. carbamido group, $H_2NCONH$—), a carbamate group, a malonic ester group, a carboxyl group, a mercapto group, a cyano group, an acetoxy group, an acryloxy group, a methylacryloxy group, a chloromethylphenyl group, a pyridyl group, a vinyl group, a dialkylamino group, a phenylalkylamino group, and an imidazolyl group; wherein n is an integer 0 or 1; wherein R' is selected from the group consisting of: a methylene group, an ethylene group, a propylene group, and a phenylene group substituted with an ethyl or a propyl group, wherein the phenylene group is bonded to Y; and wherein R is selected from the group consisting of: a methyl group, an ethyl group, and a linear or branched C3 to C6 alkyl group. Specifically, the silane coupling agent can be an epoxy-based silane, an amino-based silane, a methacryloxy-based silane, a vinyl-based silane, or a mercapto-based silane. The silane coupling treatment can be carried out by using one or more silane coupling agents.

Preferably, the base copper layer may be subjected to a pickling step to clean the drum side and the deposited side of the base copper layer prior to the surface treatment, which facilitates the subsequent surface treatment process.

In accordance with the instant disclosure, the surface morphology of the electrolytic copper foil is one of the important factors affecting the bonding strength between the electrolytic copper foil and other layers comprising active materials or dielectric materials. Preferably, at least one of the two surfaces of the electrolytic copper foil has an aspect ratio of surface profile from 14 to 693; the aspect ratio of surface profile is a ratio of a mean width of the roughness profile elements (RSm) to a root mean square deviation of the roughness profile (Rq); wherein the RSm and the Rq are obtained according to the standard method of JIS B 0601-2013. It should be defined that the two surfaces of the electrolytic copper foil refer to the outermost two surfaces of the electrolytic copper foil. In one embodiment, when the base copper layer of the electrolytic copper foil is not subjected to any surface treatment, the two surfaces of the electrolytic copper foil refer to the drum side and the deposited side of the base copper layer. In another embodiment, when the drum side and the deposited side of the base copper layer are respectively subjected to one surface treatment, the two surfaces of the electrolytic copper foil refer to the outer surfaces of the resulting two surface-treated layers. In another embodiment, when only the drum side of the base copper layer is subjected to one surface treatment, but the deposited side of the base copper layer is not subjected to any surface treatment, the two surfaces of the electrolytic copper foil refer to the outer surfaces of the resulting surface-treated layer and the deposited side of the base copper layer.

In foresaid range of the aspect ratio of surface profile, preferably, the RSm ranges from 9 µm to 523 µm; preferably, the Rq ranges from 0.14 µm to 1.34 µm. When the aspect ratio of surface profile is in the foresaid range, the surface of the electrolytic copper foil can provide a suitable space for accommodating the active materials or the resin layer, so that the surface has a better anchor effect, thereby the electrolytic copper foil can have better adhesion. More preferably, the RSm ranges from 10 µm to 400 µm; more preferably, the Rq ranges from 0.16 µm to 1.25 µm.

In the case that the electrolytic copper foil is applied to an electrode of a lithium ion battery, the aspect ratio of surface profile may be the above-mentioned range; preferably, the aspect ratio of surface profile ranges from 45 to 600; more preferably, the aspect ratio of surface profile ranges from 65 to 510. In foresaid range of the aspect ratio of surface profile, preferably, the RSm ranges from 18 µm to 400 µm; more preferably, the RSm ranges from 26 µm to 350 µm; preferably, the Rq ranges from 0.23 µm to 1.00 µm; more preferably, the Rq ranges from 0.24 µm to 0.86 µm.

In the case that the electrolytic copper foil is applied to a copper-clad laminate (CCL), the aspect ratio of surface profile may be the above-mentioned range; preferably, the aspect ratio of surface profile ranges from 30 to 400; more preferably, the aspect ratio of surface profile ranges from 35 to 370. In foresaid range of the aspect ratio of surface profile, preferably, the RSm ranges from 20 µm to 200 µm; more preferably, the RSm ranges from 21 µm to 100 µm; preferably, the Rq ranges from 0.15 µm to 1.32 µm; more preferably, the Rq ranges from 0.16 µm to 0.80 µm.

In order to control the crystal structures or surface characteristics of the electrolytic copper foil, the instant disclosure can be achieved, for example, by adjusting the electrolyte composition, the current density, or the grain size number of the surface of the cathode drum, but it is not limited to the particular process as exemplified in the specification.

In general, in addition to the source of copper ions, other organic additives contained in the electrolyte or the current density used may affect a current distribution between the anode and the cathode drum and a deposited thickness distribution of the bare copper foil during the electrolysis, and thereby some surface properties of the bare copper foil will be influenced.

For example, when polyvinylpyrrolidone (PVP) or a compound having a quaternary ammonium group is added into the electrolyte solution to act as a leveler, an adsorption behavior of the leveler is influenced by the current distribution. Since the leveler is preferentially adsorbed on a dense region of the current distribution, the excessive deposition of copper ions on the dense region of the current distribution will be suppressed, thereby obtaining a bare copper foil having smoother surfaces. Moreover, a compound having a mercapto group, a disulfide moiety, or a sulfonate group can act as an accelerator to promote the deposition of copper ions. Examples of the accelerator may comprise bis(3-sulfopropyl) disulfide (SPS), 3-mercapto-1-propanesulfonic acid sodium salt (MPS), 3-N,N-dimethyl-aminodithiocarbamoyl-1-propanesulfonic acid sodium salt (DPS), and 3-(amidinothio)-1-propanesulfonic acid (UPS), but it is not limited thereto.

In addition, the crystal density of the surface of the cathode drum is related to the aspect ratio of surface profile of the bare copper foil. The crystal density of the surface of the cathode drum can be quantified by the grain size number, and the higher the grain size number, the higher the crystal density of the surface. The grain size number can be measured according to the standard method of JIS G0552.

The instant disclosure further provides an electrode for a lithium ion battery which comprises the foresaid electrolytic copper foils, at least one binder and at least one active substance. The electrolytic copper foil is suitable for a current collector. One or both surfaces of the electrolytic copper foil are coated with one or more layers of active materials containing the active substance and an adhesive to form the electrode. The electrode can be used as a negative electrode and a positive electrode of a lithium ion battery. Preferably, the electrode is the negative electrode.

Specifically, the binder may be, but is not limited to, poly-1,1-difluoroethene (PVDF), poly(acrylic acid), carboxymethyl cellulose (CMC), styrene butadiene rubber (SBR), polyimide (PI), poly vinyl alcohol (PVA), or any combination thereof.

The active substance makes the electrode have a good cycle performance. For example, the active substance may comprise a carbon-containing substance, a silicon-containing substance, a silicon carbide composite (SiC composite), a metal, a metal oxide, a metal alloy, a polymer, or any combination thereof. Preferably, the active substance is the carbon-containing substance or the silicon-containing substance, but it is not limited thereto.

Specifically, the carbon-containing substance may be, but is not limited to, a non-graphitizing carbon, a coke, a graphite, a glasslike carbon, a carbon fiber, an activated carbon, a carbon black, or a high polymer calcined substance. Further, the coke comprises a pitch coke, a needle-shaped coke, or a petroleum coke, etc; the high polymer calcined substance is obtained by burning a high polymer such as a phenol-formaldehyde resin or a furan resin at a suitable temperature for carbonation of the high polymer.

The silicon-containing substance has an excellent ability to form an alloy with lithium ions and has an excellent ability to extract lithium ions from a lithium alloy. Therefore, when the silicon-containing substance is applied to a lithium ion battery, the obtained lithium ion battery can obtain a high energy density. The silicon-containing substance may form an alloy with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), stibium (Sb), chromium (Cr), ruthenium (Ru), molybdenum (Mo), or any combination thereof.

Specifically, the metal or the elements of the metal alloy may be selected from the group consisting of: cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), stibium (Sb), chromium (Cr), ruthenium (Ru), and molybdenum (Mo), but it is not limited thereto. Examples of the metal oxide may be, but is not limited to, iron (III) oxide ($Fe_2O_3$), iron (II, III) oxide ($Fe_3O_4$), ruthenium (IV) oxide ($RuO_2$), molybdenum (IV) oxide ($MoO_2$), or molybdenum (VI) oxide ($MoO_3$).

Specifically, the polymer may be, but is not limited to, polyacetylene or polypyrrole.

In addition, the electrode may comprise an auxiliary additive as needed without affecting the function of the electrode of the instant disclosure. The auxiliary additive may be, but is not limited to, lithium hydroxide (LiOH) or oxalic acid ($H_2C_2O_4$).

In accordance with the instant disclosure, the electrode may be applied to a lithium ion battery, and an electronic device comprising the lithium ion battery made with the same, such as a mobile power, a smart phone, a notebook computer, an electric vehicle, or the like.

The instant disclosure further provides a copper-clad laminate comprising the foresaid electrolytic copper foil and a resin substrate. The copper-clad laminate may be applied to the field of printed circuit boards such as a rigid copper foil substrate, a flexible copper foil substrate, or IC substrate, but it is not limited thereto.

Specifically, a material of the substrate may be a polyimide resin, an epoxy resin, or polyethylene terephthalate (PET) resin, but it is not limited thereto.

Other objectives, advantages and novel features of the disclosure will become more apparent from the following detailed description when taken in conjunction with the accompanying drawings.

DETAILED DESCRIPTION OF THE DISCLOSURE

Hereinafter, one skilled in the art can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

(Electrolytic Copper Foil)

Examples 1 to 9

Figure 1:
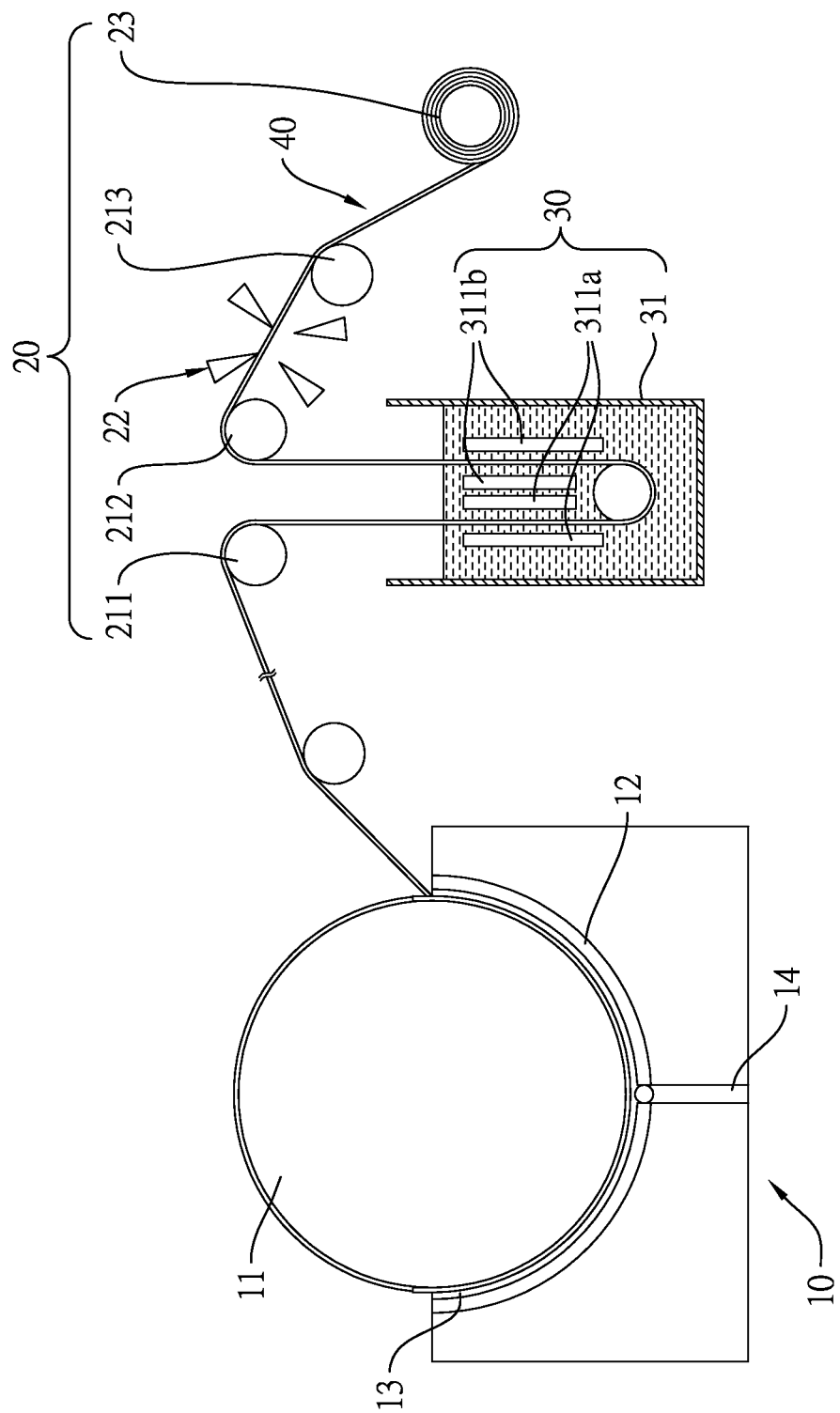
FIG. 1 is a schematic perspective view of making an electrolytic copper foil of Example 1.

Examples 1 to 9 used the manufacturing apparatus as shown in FIG. 1, and were sequentially subjected to similar processes such as an electrodeposition step and a surface treatment step to obtain the electrolytic copper foils of Examples 1 to 9. The main differences among Examples 1 to 9 were the composition of the electrolyte solutions and the grain size number of the surface of the cathode drums.

With reference to FIG. 1, the manufacturing apparatus for electrolytic copper foil 40 comprised an electrodeposition equipment 10, a series of guide rollers 20 and a surface treatment equipment 30. The electrodeposition equipment 10 comprised a cathode drum 11, an anode plate 12, a copper electrolyte solution 13 and a feed pipe 14. The cathode drum 11 was rotatable and the anode plate 12 was set below the cathode drum 11 and surrounded the lower half of the cathode drum 11. A space existed between the cathode drum 11 and the anode plate 12 to allow the copper electrolyte solution 13 to be introduced through the feed pipe 14. The surface treatment equipment 30 comprised an anti-corrosion treatment tank 31 and two sets of the first electrode plates 311a and 311b disposed therein. The series of guide rollers 20 comprised a first guide roller 211, a second guide roller 212, a third guide roller 213, and a set of an air knife 22 and a take-up roller 23. The series of guide rollers 22 were used for transporting a bare copper foil, a surface-treated copper foil and the product, and finally the obtained electrolytic copper foil 40 was wound on the take-up roller 23.

The methods for producing the electrolytic copper foils 40 of Examples 1 to 9 with the manufacturing apparatus as shown in FIG. 1 were described as follows.

First, the copper electrolyte solution 13 was prepared for the electrodeposition step, and the composition therein was as follows.

1. Essential solution:
    (1) copper sulfate ($CuSO_4 \square 5H_2O$): 315 g/L; and
    (2) sulfuric acid: 95 g/L.
2. Additives:
    (1) chloride ion (derived from HCl, which was purchased from RCI Labscan Ltd.): 35 mg/L;
    (2) lead ion ($Pb^{2+}$): 5 ppm;
    (3) PVP: 2.5 mg/L to 5.0 mg/L; and
    (4) UPS: 2.5 mg/L.

Among them, the content ratios of the leveler (i.e. PVP) and the accelerator (i.e. UPS) in the copper electrolyte solution 13 for producing the electrolytic copper foils 40 of Examples 1 to 9 were listed in Table 1. Moreover, the grain size numbers of the cathode drums 11 for producing the electrolytic copper foils 40 of Examples 1 to 9 were also listed in Table 1.

In the electrodeposition step, the copper electrolyte solution 13 was controlled at the temperature of 52° C. A current with a current density of 40 A/dm² flowed between the cathode drum 11 and the anode plate 12 to make copper ions in the copper electrolyte solution 13 electrodeposited on the surface of the cathode drum 11 to form the bare copper foil. Subsequently, the bare copper foil was peeled off from the cathode drum 11 and guided to the first guide roller 211.

First Surface Treatment

Subsequently, the bare copper foil was transported to the surface treatment equipment 30 through the first guide roller 211 to undergo a first surface treatment. The bare copper foil was immersed in the anti-corrosion treatment tank 31, which was full of a chromate solution, and two surface-treated layers 42 were respectively attached on both of the surfaces of the bare copper foil through an electrodeposition step by using the two sets of the first electrode plates 311a and 311b.

The composition of the chromate solution and the manufacturing parameters of the first surface treatment were listed below.

1. The composition of the chromate solution: chromic acid ($CrO_3$): 1.5 g/L.
2. The manufacturing parameters:
    (1) temperature of the chromate solution: 25° C.;
    (2) current density: 0.5 $A/dm^2$; and
    (3) duration of treatment: 2 seconds.

After completion of the first surface treatment, the bare copper foil which has been processed with the anti-corrosion treatment was guided to the second guide roller 212 and then was dried by the air knife 22. After that, the foresaid copper foil was guided to the take-up roller 23 through the third guide roller 213, so the foresaid copper foil was wound to obtain the electrolytic copper foil 40.

Figure 2:
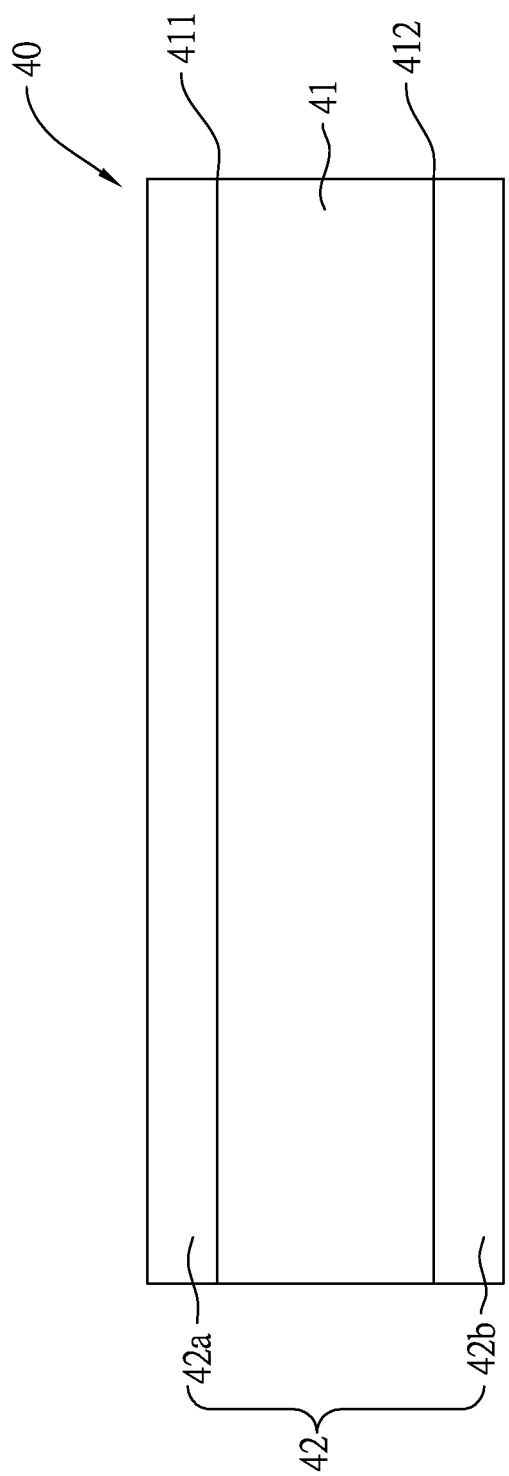
FIG. 2 is a schematic side view of the electrolytic copper foil of Example 1.

According to the foresaid process, the electrolytic copper foils of Examples 1 to 9 were respectively obtained. With reference to FIG. 2, the electrolytic copper foil 40 of each Example comprised a base copper layer 41 (i.e. the bare copper foil was not treated with the anti-corrosion treatment) and two surface-treated layers 42. The base copper layer 41 comprised a deposited side 411 and a drum side 412 opposite the deposited side 411. The surface-treated layers 42 comprised a first surface-treated layer 42a (i.e. first chromium layer) and a second surface-treated layer 42b (i.e. second chromium layer). The first surface-treated layer 42a directly covered the deposited side 411 of the base copper layer 41, and the second surface-treated layer 42b directly covered the drum side 412 of the base copper layer 41.

Comparative Examples 1 to 4

Electrolytic copper foils of Comparative Examples 1 to 4 were used as the controls of the electrolytic copper foils of Examples 1 to 9, which were produced by similar process used to manufacture the electrolytic copper foils of Examples 1 to 9. The main differences between the processes of Examples and Comparative Examples were that the content ratios between the leveler and the accelerator in the copper electrolyte solution (PVP: 2.0 mg/L to 8.25 mg/L and UPS: 2.5 mg/L) and the grain size number of the surface of the cathode drums used. The above parameters were all listed in Table 1. In addition, the structures of the electrolytic copper foils of Comparative Examples 1 to 4 were as shown in FIG. 2.

Examples 10 to 14

Figure 3:
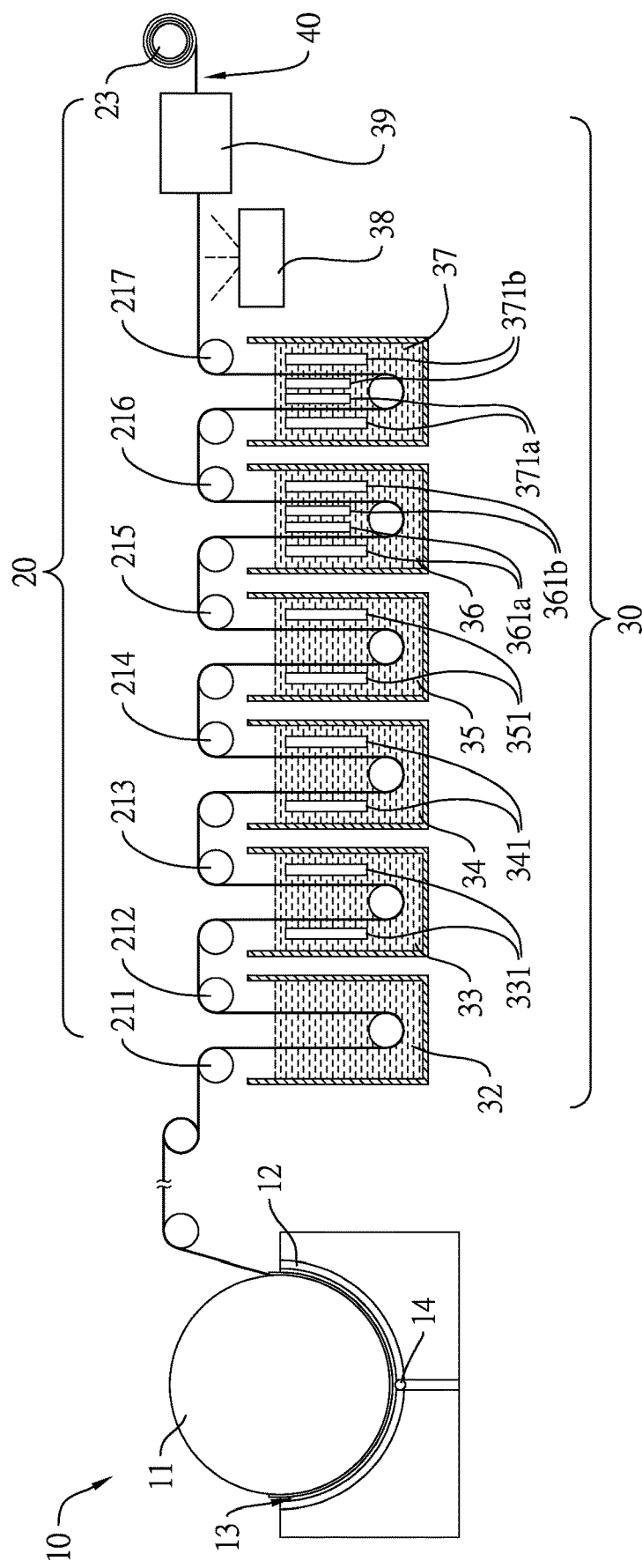
FIG. 3 is a schematic perspective view of making an electrolytic copper foil of Example 10.

Examples 10 to 14 used the manufacturing apparatus as shown in FIG. 3, and were sequentially subjected to the substantially same processes such as an electrodeposition step and multiple surface treatment steps to obtain the electrolytic copper foils of Examples 10 to 14. The main difference among Examples 10 to 14 were the parameters of the multiple surface treatment steps and the desired surfaces to be treated.

With reference to FIG. 3, the manufacturing apparatus for electrolytic copper foil 40 comprised an electrodeposition equipment 10, a series of guide rollers 20 and a surface treatment equipment 30. The electrodeposition equipment 10 comprised a cathode drum 11, an anode plate 12, a copper electrolyte solution 13 and a feed pipe 14. The anode plate 12 was set below the cathode drum 11 and surrounded the lower half of the cathode drum 11. A space existed between the cathode drum 11 and the anode plate 12 to allow the copper electrolyte solution 13 to be introduced through the feed pipe 14. The surface treatment equipment 30 comprised a pickling treatment tank 32, a nodule treatment tank 33 and a set of the second electrode plates 331 disposed therein, a copper covering treatment tank 34 and a set of the third electrode plates 341 disposed therein, a nickel plating tank 35 and a set of the fourth electrode plates 351 disposed therein, a zinc plating tank 36 and two sets of the fifth electrode plates 361a and 361b disposed therein, a chromium plating tank 37 and two sets of the sixth electrode plates 371a and 371b disposed therein, a silane coupling agent spraying equipment 38 and a drier 39. The series of guide rollers 20 comprised a first guide roller 211, a second guide roller 212, a third guide roller 213, a fourth guide roller 214, a fifth guide roller 215, a sixth guide roller 216, a seventh guide roller 217 and a take-up roller 23. The series of guide rollers 22 were used for transporting a bare copper foil, a copper foil which was subjected to each surface treatment, and the product, and finally the electrolytic copper foil 40 was obtained by being wound on the take-up roller 23.

The methods for producing the electrolytic copper foils 40 of Examples 10 to 14 with the manufacturing apparatus as shown in FIG. 3 were described as follows.

Electrodeposition Step

Examples 10 to 14 were all subjected to the same electrodeposition step. In the electrodeposition step, the copper electrolyte solution 13 was controlled at the temperature of 52° C., and a current with a current density of 40 $A/dm^2$ flowed between the cathode drum 11 and the anode plate 12 to make copper ions in the copper electrolyte solution 13 electrodeposited on the surface of the cathode drum 11 to form the bare copper foil. Subsequently, the bare copper foil was peeled off from the cathode drum 11 and guided to the first guide roller 211. The composition of foresaid copper electrolyte solution 13 was identical to the copper electrolyte solution used for Example 7, and the surface of foresaid cathode drum 11 also had the same grain size number with the cathode drum used for Example 7.

Surface Treatment Steps

Since the surface treatment steps for Examples 10 to 14 had some difference, the surface treatment steps employed in the Examples were each described below.

Electrolytic Copper Foil of Example 10: Obtained Through a Second Surface Treatment The second surface treatment included the following seven surface treatment procedures, and those parameters in each surface treatment procedure were as follows.

I. Pickling Treatment:

The bare copper foil of Example 10 was transported to the pickling tank 32 through the first guide roller 211, and foresaid bare copper foil was immersed into a pickling solution to clean both sides of the bare copper foil. The composition of the pickling solution and the concerned manufacturing parameters were listed below.

1. The composition of the pickling solution:
    (1) copper sulfate ($CuSO_4 \square 5H_2O$): 200 g/L; and
    (2) sulfuric acid: 100 g/L.
2. The manufacturing parameters:
    (1) temperature of the pickling solution: 25° C.; and
    (2) duration of treatment: 5 seconds.

Figure 4A:
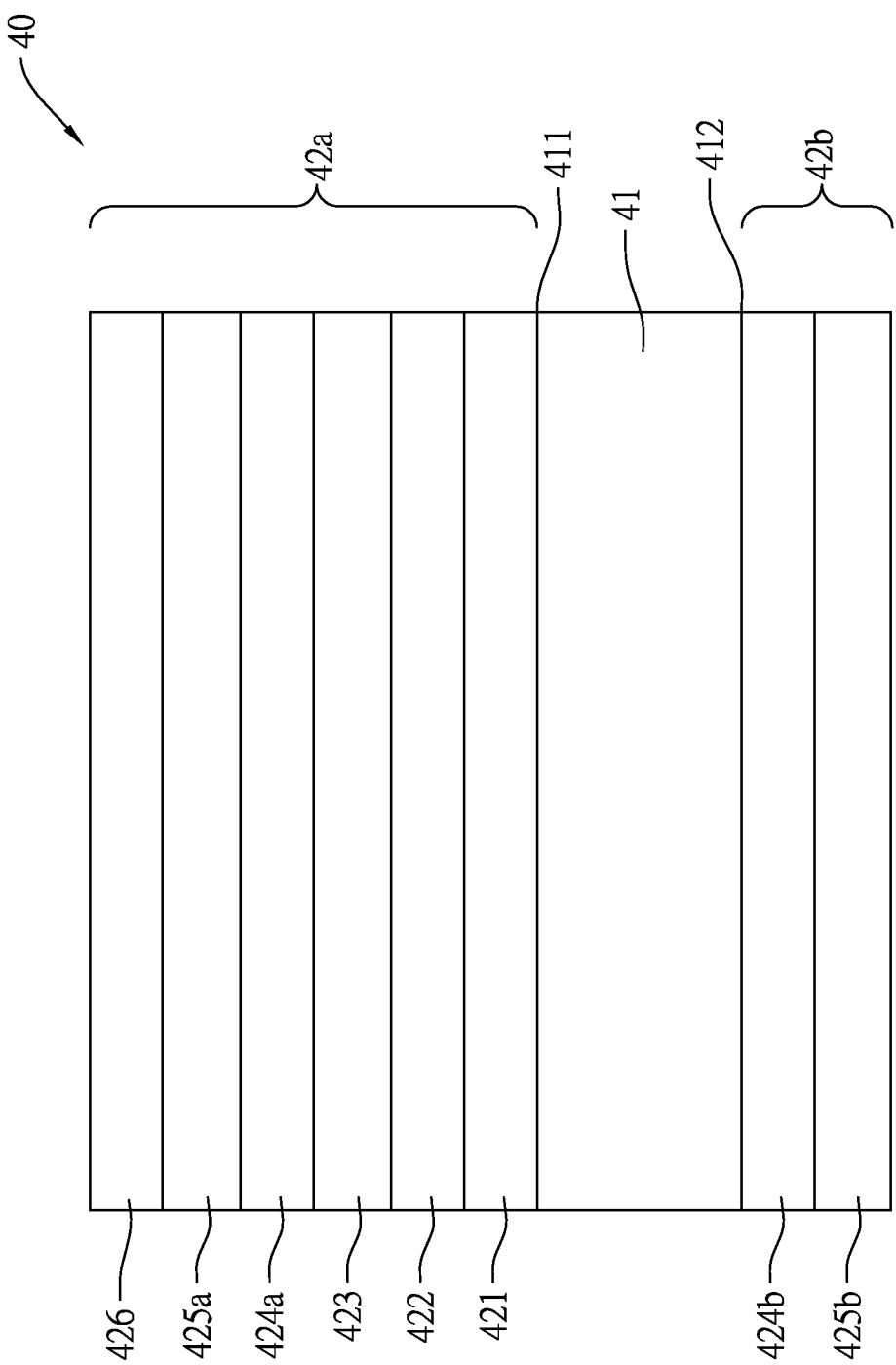
FIG. 4A is a schematic side view of the electrolytic copper foil of Example 10.

After a completion of the above procedure, the bare copper foil which has been subjected to the pickling treatment was guided to the second guide roller 212 and then was transported to the nodule treatment tank 33. With reference to FIG. 4A, in this Example, the bare copper foil after the pickling treatment corresponded to the base copper foil 41 of the instant disclosure, which comprised a deposited side 411 and a drum side 412 opposite to the deposited side 411.

II. Nodule Treatment:

The bare copper foil after the pickling treatment was immersed into a roughening solution of the nodule treatment tank 33, and the deposited side 411 was subjected to an electrodeposition process by the second electrode plates 331 to form a nodule treated layer 421 attached thereon. The composition of the roughening solution and the concerned manufacturing parameters were listed below.

1. The composition of the roughening solution:
   (1) copper sulfate ($CuSO_4 \cdot 5H_2O$): 200 g/L; and
   (2) sulfuric acid: 100 g/L.
2. The manufacturing parameters:
   (1) temperature of the roughening solution: 25° C.;
   (2) current density: 40 A/dm$^2$; and
   (3) duration of treatment: 5 seconds.

After a completion of the above procedure, the copper foil which has been subjected to the nodule treatment was guided to the third guide roller 213 and then was transported to the copper covering treatment tank 34.

III. Copper Covering Treatment:

The copper foil after the nodule treatment was immersed into a copper covering solution of the copper covering treatment tank 34, and the nodule treated layer 421 was subjected to an electrodeposition process by the third electrode plates 341 to form a copper covering layer 422 attached thereon. The composition of the copper covering solution and the concerned manufacturing parameters were listed below.

1. The composition of the copper covering solution:
   (1) copper sulfate ($CuSO_4 \cdot 5H_2O$): 320 g/L; and
   (2) sulfuric acid: 100 g/L.
2. The manufacturing parameters:
   (1) temperature of the copper covering solution: 40° C.;
   (2) current density: 20 A/dm$^2$; and
   (3) duration of treatment: 5 seconds.

After a completion of the above procedure, the copper foil which has been subjected to the copper covering treatment was guided to the fourth guide roller 214 and then was transported to the nickel plating tank 35.

IV. Nickel Plating:

The copper foil after the copper covering treatment was immersed into a nickel electrolyte solution of the nickel plating tank 35, and the copper covering layer 422 was subjected to an electrodeposition process by the fourth electrode plates 351 to form a nickel layer 423 attached thereon. The composition of the nickel electrolyte solution and the concerned manufacturing parameters were listed below.

1. The composition of the nickel electrolyte solution:
   (1) nickel(II) sulfate ($NiSO_4 \cdot 6H_2O$): 170 g/L to 200 g/L; and
   (2) boric acid: 20 g/L to 40 g/L.
2. The manufacturing parameters:
   (1) temperature of the nickel electrolyte solution: 20° C.;
   (2) current density: 0.5 A/dm$^2$; and
   (3) duration of treatment: 10 seconds.

After a completion of the above procedure, the copper foil which has been subjected to the nickel plating was guided to the fifth guide roller 215 and then was transported to the zinc plating tank 36.

V. Zinc Plating:

The copper foil after the nickel plating was immersed into a zinc electrolyte solution of the zinc plating tank 36, and the nickel layer 423 and the drum side 412 were respectively subjected to an electrodeposition process by the two sets of the fifth electrode plates 361a and 361b to form a first zinc layer 424a attached on the nickel layer 423 and a second zinc layer 424b attached on the drum side 412. The composition of the zinc electrolyte solution and the concerned manufacturing parameters were listed below.

1. The composition of the zinc electrolyte solution:
   (1) zinc sulfate ($ZnSO_4 \cdot 7H_2O$): 5 g/L to 15 g/L; and
   (2) ammonium trioxovanadate(V): 0.1 g/L to 0.4 g/L.
2. The manufacturing parameters:
   (1) temperature of the zinc electrolyte solution: 20° C.;
   (2) current density: 0.5 A/dm$^2$; and
   (3) duration of treatment: 10 seconds.

After a completion of the above procedure, the copper foil which has been subjected to the zinc plating was guided to the sixth guide roller 216 and then was transported to the chromium plating tank 37.

VI. Chromium Plating:

The copper foil after the zinc plating was immersed into a chromium electrolyte solution of the chromium plating tank 37, and the first zinc layer 424a and the second zinc layer 424b were respectively subjected to an electrodeposition process by the two sets of the sixth electrode plates 371a and 371b to form a first chromium layer 425a attached on the first zinc layer 424a and a second chromium layer 425b attached on the second zinc layer 424b. The composition of the chromium electrolyte solution and the concerned manufacturing parameters were listed below.

1. The composition of the chromium electrolyte solution:
   (1) chromic acid ($CrO_3$): 1.6 g/L to 1.8 g/L.
2. The manufacturing parameters:
   (1) temperature of the chromium electrolyte solution: 45° C.;
   (2) current density: 2.7 A/dm$^2$; and
   (3) duration of treatment: 10 seconds.

After a completion of the above procedure, the copper foil which has been subjected to the chromium plating was guided to the seventh guide roller 217.

VII. Silane Coupling Treatment:

On the way that the copper foil after the chromium plating was introduced to the take-up roller 23 through the seventh guide roller 217, a solution comprising a silane coupling agent was sprayed onto the surface of the first chromium layer 425a by the silane coupling agent spraying equipment 38 to form a silane coupling layer 426 attached on the first chromium layer 425a. The composition of the solution comprising the silane coupling agent and the concerned manufacturing parameters were listed below.

1. The composition of the solution comprising the silane coupling agent:
   (1) 3-glycidoxypropyl trimethoxysilane (product name: KBM 403): an aqueous solution of 0.25 wt %.
2. The manufacturing parameters:
   (1) duration of treatment: 10 seconds.

After a completion of the second surface treatment, the copper foil which has been subjected to the silane coupling treatment was guided to the drier 39. After that, the foresaid copper foil was guided to the take-up roller 23, so the foresaid copper foil was wound to obtain the electrolytic copper foil 40.

Electrolytic Copper Foil of Example 11: Obtained Through a Third Surface Treatment The process used to manufacture the electrolytic copper foil of Example 11 was similar to the process used to manufacture the electrolytic copper foil of Example 10 except that the second surface treatment used in Example 10 was replaced with the third surface treatment used in Example 11. The difference between the second and third surface treatments was the respective current density in the nodule treatment procedures; wherein the current density in the nodule treatment of the third surface treatment was 35 A/dm².

Electrolytic Copper Foil of Example 12: Obtained Through a Fourth Surface Treatment The process used to manufacture the electrolytic copper foil of Example 12 was similar to the process used to manufacture the electrolytic copper foil of Example 10 except that the second surface treatment used in Example 10 was replaced with the fourth surface treatment used in Example 12. The difference between the second and fourth surface treatments was the respective current density in the nodule treatment procedures; wherein the current density in the nodule treatment of the fourth surface treatment was 20 A/dm².

Electrolytic Copper Foil of Example 13: Obtained Through a Fifth Surface Treatment The process used to manufacture the electrolytic copper foil of Example 13 was similar to the process used to manufacture the electrolytic copper foil of Example 10 except that the second surface treatment used in Example 10 was replaced with the fifth surface treatment used in Example 13. The difference between the second and fifth surface treatments was the respective current density in the nodule treatment procedures; wherein the current density in the nodule treatment of the fifth surface treatment was 55 A/dm².

Electrolytic Copper Foil of Example 14: Obtained Through a Sixth Surface Treatment The process used to manufacture the electrolytic copper foil of Example 14 was similar to the process used to manufacture the electrolytic copper foil of Example 10 except that the second surface treatment used in Example 10 was replaced with the sixth surface treatment used in Example 14. The differences between the second and sixth surface treatments were the respective current density in the nodule treatment procedures and the surface to be subjected to the nodule treatment procedures; wherein the current density in the nodule treatment of the sixth surface treatment was 30 A/dm², and the surface subjected to the nodule treatment procedure of the sixth surface treatment was the drum side 412. Therefore, the nickel layer 423 and the deposited side 411 were respectively subjected to the zinc plating of the sixth surface treatment.

According to the foresaid process, the electrolytic copper foils of Examples 10 to 14 were respectively obtained.

With reference to FIG. 4A, the electrolytic copper foil 40 of Examples 10 to 13 respectively comprised a base copper layer 41 and a first surface-treated layer 42a and a second surface-treated layer 42b. The base copper layer 41 comprised a deposited side 411 and a drum side 412 opposite to the deposited side 411. The surface-treated layer 42a was deposited on the deposited side 411 of the base copper layer 41, and comprised the nodule treated layer 421 on the deposited side 411, the copper covering layer 422, the nickel layer 423, the first zinc layer 424a, the first chromium layer 425a and the silane coupling layer 426 in order. The second surface-treated layer 42b was deposited on the drum side 412 of the base copper layer 41, and comprised the second zinc layer 424b on the drum side 412 and the second chromium layer 425b in order.

Figure 4B:
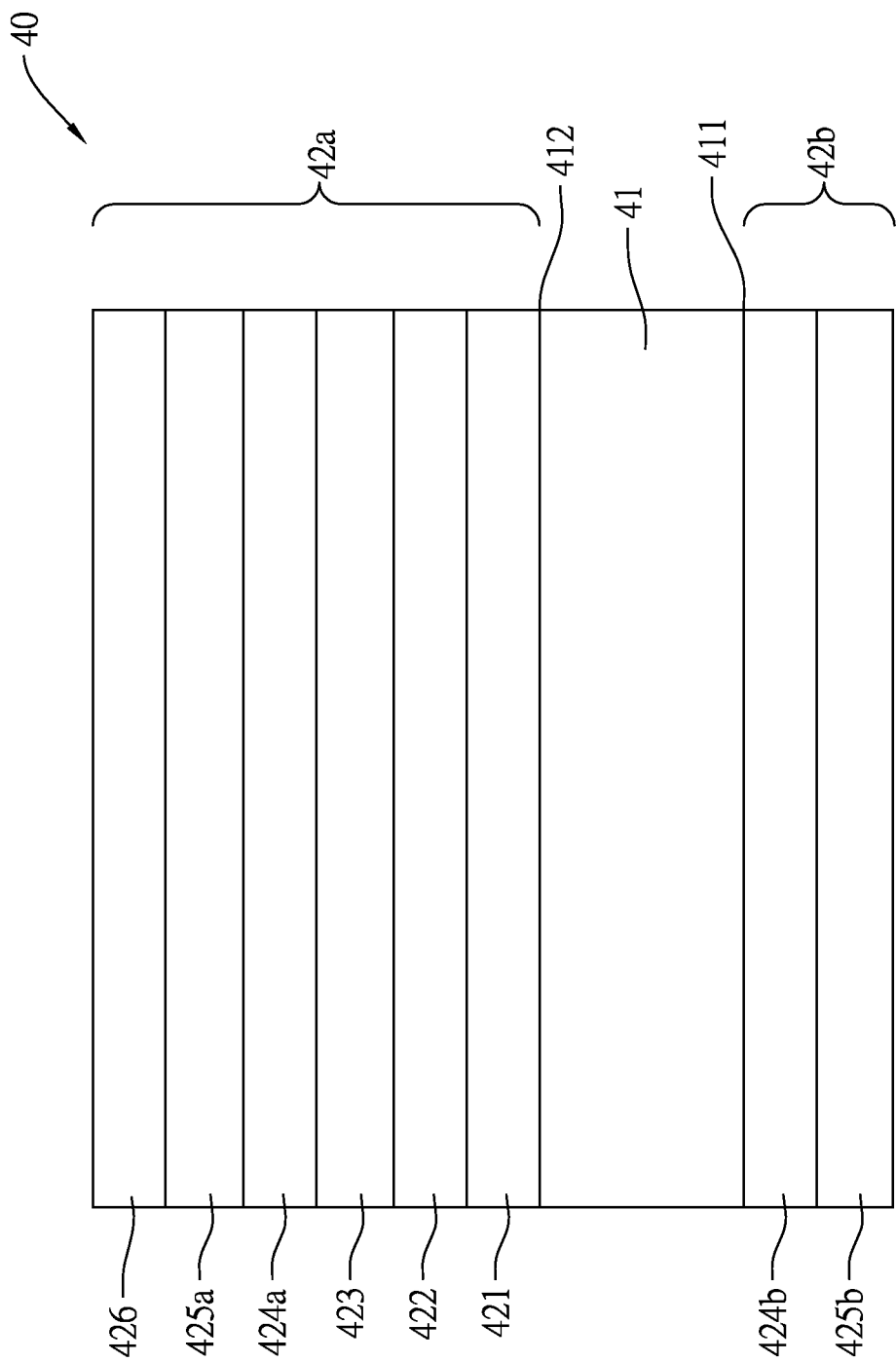
FIG. 4B is a schematic side view of the electrolytic copper foil of Example 14.

In addition, with reference to FIG. 4B, the electrolytic copper foil 40 of Example 14 comprised a base copper layer 41 and a first surface-treated layer 42a and a second surface-treated layer 42b. The base copper layer 41 comprised a deposited side 411 and a drum side 412 opposite to the deposited side 411. The surface-treated layer 42a was deposited on the drum side 412 of the base copper layer 41, and comprised the nodule treated layer 421 on the drum side 412, the copper covering layer 422, the nickel layer 423, the first zinc layer 424a, the first chromium layer 425a and the silane coupling layer 426 in order. The second surface-treated layer 42b was deposited on the deposited side 411 of the base copper layer 41, and comprised the second zinc layer 424b and the second chromium layer 425b in order.

Analysis 1: Weight and Average Thickness Per Unit Area of the Electrolytic Copper Foil Each of the electrolytic copper foils of Examples 1 to 14 (expressed as E1 to E14) and Comparative Examples 1 to 4 (expressed as C1 to C4) was cut into a sample of 100 mm in length and width, and each sample was weighed by the microbalance AG-204 (purchased from Mettler Toledo International Inc.); further, the measured weight value of each sample was divided by its area and then the unit was converted to g/m² to obtain the weight per unit area of each of the electrolytic copper foils.

Moreover, according to the standard test method of IPC-TM-650 2.4.18, the density of each of the electrolytic copper foils was about $8.909*10^6$ g/m³. Then, an average thickness of each of the electrolytic copper foils of E1 to E14 and C1 to C4 was respectively calculated by the following formula (I). Therefore, the weight per unit area and average thickness of each of the electrolytic copper foils of E1 to E14 and C1 to C4 were listed in Table 1.

$$\text{Average thickness of the electrolytic copper foil (μm)=weight per unit area/density of the electrolytic copper foil} \qquad (I)$$

Analysis 2: Charpy Impact Strength of the Electrolytic Copper Foil

Each of the electrolytic copper foils of E1 to E14 and C1 to C4 was cut into a sample without a notch.

The sample was vertically adhered to the side wall of the stage of the impact tester with three layers of a tape; then, a pendulum of the impact tester was dropped from a specific height to make an impact on the center of the sample. The Charpy impact strength of the sample referred to an amount of energy absorbed per unit area right before fracture. The results were also listed in Table 1. The relevant test conditions were also recorded as follows.

1. Impact tester: No. 611 manufactured by Toyo Seiki Seisaku-sho, Ltd;
2. tape: BOPP Packing Tape, 18 mm in width, purchased from Yem Chio Co., Ltd;
3. size of each sample: 83 mm in length×15 mm in width;
4. temperature: 25±5° C.;
5. mass of the pendulum (W): 0.938 kg;
6. length from the gravity center of the pendulum to the center of rotation (R): 0.20157 m; and
7. angle of fall (a): 125.58°.

Analysis 3: Wrinkle Test of the Electrolytic Copper Foil

The surfaces of the electrolytic copper foils of E1 to E14 and C1 to C4 were each inspected whether wrinkles occurred after using a slitter machine to apply a tension.

Each sample with a width of 1380 mm was fed between two horizontal fixed rolls of the slitter machine (distance: 700 mm), and then the two horizontal fixed rolls were rotated to apply different tensions to the sample. When applying a tension of 10 kg, the surface of the sample was visually observed for wrinkles. As the inspecting results listed in Table 1, no wrinkle on the surface meant "pass", and any wrinkle on the surface meant "fail."

TABLE 1

| Example No. | Content ratio of the leveler to the accelerator | Grain size number of the surface of the cathode drum | Weight per unit area (g/m²) | Average thickness (μm) | Charpy impact strength (J/mm²) | Wrinkle test |
|---|---|---|---|---|---|---|
| E1 | 2.0 | 7.5 | 53.5 | 6.0 | 3.8 | Pass |
| E2 | 1.4 | 7.5 | 53.5 | 6.0 | 5.3 | Pass |
| E3 | 1.0 | 7.5 | 53.5 | 6.0 | 0.5 | Pass |
| E4 | 1.0 | 7 | 53.5 | 6.0 | 0.4 | Pass |
| E5 | 1.4 | 10 | 53.5 | 6.0 | 5.8 | Pass |
| E6 | 1.3 | 8 | 53.5 | 6.0 | 2.4 | Pass |
| E7 | 1.1 | 7.5 | 53.5 | 6.0 | 1.2 | Pass |
| E8 | 1.1 | 7.5 | 24.1 | 2.7 | 1.3 | Pass |
| E9 | 1.1 | 7.5 | 343.0 | 38.5 | 1.3 | Pass |
| E10 | 1.1 | 7.5 | 106.9 | 12.0 | 1.3 | Pass |
| E11 | 1.1 | 7.5 | 106.9 | 12.0 | 1.3 | Pass |
| E12 | 1.1 | 7.5 | 106.9 | 12.0 | 1.3 | Pass |
| E13 | 1.1 | 7.5 | 106.9 | 12.0 | 1.2 | Pass |
| E14 | 1.1 | 7.5 | 106.9 | 12.0 | 1.3 | Pass |
| C1 | 3.3 | 7.5 | 53.5 | 6.0 | 0.2 | Fail |
| C2 | 0.8 | 7.5 | 53.5 | 6.0 | 0.3 | Fail |
| C3 | 1.0 | 6 | 53.5 | 6.0 | 0.2 | Fail |
| C4 | 1.7 | 10 | 53.5 | 6.0 | 7.2 | Fail |

Discussion on Characteristics of the Electrolytic Copper Foils

From the analytical results of Table 1, it demonstrated that the electrolytic copper foils of E1 to E14 with a specific appropriate range of the Charpy impact strength had an improved wrinkle resistance to avoid the occurrence of wrinkles on the surface of the electrolytic copper foils, and then the production yield thereof will be improved. Regardless of the thickness of the electrolytic copper foils, for example, the thicker electrolytic copper foils such as the electrolytic copper foils of E9 to E14 or the thinner electrolytic copper foil such as the electrolytic copper foil of E8, the occurrence of wrinkles on the surface of the electrolytic copper foils could be all mitigated and even avoided. In contrast, referring to the electrolytic copper foils of C1 to C4, which did not control the Charpy impact strength thereof within the specific appropriate range, the electrolytic copper foils of C1 to C4 still had wrinkles, and then were disadvantageous for subsequent applications.

Analysis 4: Surface Profile of the Electrolytic Copper Foil

The electrolytic copper foils of E1 to E14 and C1 to C4 were further analyzed for the surface profile of the electrolytic copper foils by a surface roughness meter. According to the standard method of JIS B 0601-2013, a Rq and a RSm of the first surface-treated layer of the electrolytic copper foils of E1 to E9 and C1 to C4 were measured and listed in Table 2, and a Rq and a RSm of the first surface-treated layer of the electrolytic copper foils of E10 to E14 were measured and listed in Table 3. The relevant test conditions were also recorded as follows.

1. surface roughness meter: SE600 model produced by Kosaka Laboratory Ltd.;
2. radius of stylus tip: 2 μm;
3. angle of stylus tip: 90°;
4. scan speed: 0.5 mm/sec;
5. cut-off of the filter: 0.8 mm (λc) and 2.5 μm (λs); and
6. evaluation length: 4 mm.

In addition, an aspect ratio of surface profile of the electrolytic copper foils of E1 and E14 and C1 to C4 could be calculated according to the obtained RSm and Rq, and the following formula (II). The results were also listed in Tables 2 and 3.

Aspect ratio of surface profile=RSm (μm)/Rq (μm)    (II)

(Electrodes for a Lithium Ion Battery)

A negative electrode slurry was coated on the first surface-treated layer of each of the electrolytic copper foils of E1 to E9 and C1 to C4 respectively. After a completion of coating, the coated electrolytic copper foils were dried and then rolled by a pressing machine to obtain negative electrodes for a lithium ion battery, which were electrodes of Examples 1-A to 9-A (expressed as E1-A to E9-A) and Comparative Examples 1-A to 4-A (expressed as C1-A to C4-A). The negative electrode slurry was composed of 100 parts by weight of a negative electrode active material and 60 parts by weight of 1-Methyl-2-pyrrolidone (NMP). The composition of the negative electrode active material and the concerned manufacturing parameters were listed below.

1. The composition of the negative electrode active material: (based on the total weight of the negative electrode active material)
   (1) mesophase graphite powder (MGP): 93.9 wt %;
   (2) conductive additive: 1 wt % of conductive carbon black (Super P®);
   (3) solvent-based binder: 5 wt % of poly-1,1-difluoroethene (PVDF 6020); and
   (4) oxalic acid: 0.1 wt %.

2. The manufacturing parameters:
   (1) coating speed: 5 m/min;
   (2) coating thickness: 200 μm;
   (3) drying temperature: 160° C.;
   (4) material, size and hardness of a roller of the pressing machine: made from high-carbon chromium bearing steel (SUJ2); a diameter of 250 mm; and a Rockwell hardness (HRC) of 62 to 65 degrees; and
   (5) speed and pressure of rolling: a rate of 1 m/min; a pressure of 3000 pound per square inch (psi).

Analysis 5: Analyzing the Peel Strength of the Electrodes (Peel Strength Test I)

Each of the electrodes of E1-A to E9-A and C1-A to C4-A was cut into a sample. Both surfaces of the sample respectively adhered to a tape and was analyzed for a peel strength between the first surface-treated layer of the electrolytic copper foil and the negative electrode active material of each sample by a universal testing machine, and the analytical results were shown in Table 2. In the case that the first surface-treated layer of the electrolytic copper foil and the negative electrode active material were not separated, the result was recorded as "pass", but in the case that the first surface-treated layer of the electrolytic copper foil and the negative electrode active material were separated, the result was recorded as "fail." The relevant test conditions were recorded as follows.

1. universal testing machine: TKS-20N manufactured by IMADA CO., LTD.;
2. sample size: 100 mm×50 mm;
3. tape: 810 D manufactured 3M Company;
4. performing temperature: 15° C. to 35° C.;
5. peeling angle: 90°; and
6. peeling speed: 50 mm/min.

TABLE 2

| Electrolytic copper foil No./ Electrode No. | Charpy impact strength (J/mm²) | Aspect ratio of surface profile | RSm (μm) | Rq (μm) | Peel strength test I |
|---|---|---|---|---|---|
| E1/ E1-A | 3.8 | 467 | 126 | 0.27 | Pass |

TABLE 2-continued

| Electrolytic copper foil No./ Electrode No. | Charpy impact strength (J/mm²) | Aspect ratio of surface profile | RSm (µm) | Rq (µm) | Peel strength test I |
|---|---|---|---|---|---|
| E2/E2-A | 5.3 | 506 | 167 | 0.33 | Pass |
| E3/E3-A | 0.5 | 411 | 308 | 0.75 | Pass |
| E4/E4-A | 0.4 | 345 | 283 | 0.82 | Pass |
| E5/E5-A | 5.8 | 75 | 18 | 0.24 | Pass |
| E6/E6-A | 2.4 | 67 | 26 | 0.39 | Pass |
| E7/E7-A | 1.2 | 295 | 174 | 0.59 | Pass |
| E8/E8-A | 1.3 | 273 | 169 | 0.62 | Pass |
| E9/E9-A | 1.3 | 273 | 172 | 0.63 | Pass |
| C1/C1-A | 0.2 | 105 | 21 | 0.20 | Fail |
| C2/C2-A | 0.3 | 413 | 417 | 1.01 | Fail |
| C3/C3-A | 0.2 | 662 | 523 | 0.79 | Fail |
| C4/C4-A | 7.2 | 41 | 9 | 0.22 | Fail |

As the analytical results shown in Tables 1 and 2, since the electrolytic copper foils of E1 to E9 were free from wrinkles, the concerned electrodes of E1-A to E9-A could pass the peel strength test I; that is, it demonstrated that the electrodes comprising the electrolytic copper foils of E1 to E9 indeed had a better adhesion, which was advantageous for the electrodes for a lithium ion battery to have a longer battery life.

<Copper-Clad Laminate>

Each of the electrolytic copper foils of E10 to E14 faced a resin substrate, which was the first surface-treated layer thereof and then was subjected to a lamination step. After that, 10 mm-wide circuits were respectively formed on the electrolytic copper foils of E10 to E14 to obtain copper-clad laminates of Examples 10-A to 14-A (expressed as E10-A to E14-A). The concerned manufacturing parameters were recorded as follows.

1. resin substrate: a prepreg comprising a dielectric thermoset resin layer (CCP-609G manufactured from Chang Chun Plastics Co., Ltd.); and 2. temperature, pressure and duration of the lamination step: 200° C., 400 psi, and 120 min.

Analysis 6: Analyzing the Peel Strength of the Copper-Clad Laminate (Peel Strength Test II)

According to a standard method of IPC-TM-650 2.4.8.5, the peel strength of each of the copper-clad laminates of E10-A to E14-A was analyzed. The peel strength referred to the adhesion between the electrolytic copper foil and the substrate. The analytical results were shown in Table 3. In the case that the peel strength of the copper-clad laminate was more than 1.0 kg/cm, the result was represented by "◎"; in the case that the peel strength of the copper-clad laminate was equal to or more than 0.6 kg/cm and equal to or smaller than 1.0 kg/cm, the result was represented by "○"; and in the case that the peel strength of the copper-clad laminate was equal to or more than 0.1 kg/cm and smaller than 0.6 kg/cm, the result was represented by "Δ."

TABLE 3

| Electrolytic copper foil No./ CCL No. | Charpy impact strength (J/mm²) | Aspect ratio of surface profile | RSm (µm) | Rq (µm) | Peel strength test II |
|---|---|---|---|---|---|
| E10/E10-A | 1.3 | 37 | 22 | 0.59 | ◎ |
| E11/E11-A | 1.3 | 58 | 72 | 1.25 | ◎ |
| E12/E12-A | 1.3 | 14 | 19 | 1.34 | Δ |
| E13/E13-A | 1.2 | 693 | 97 | 0.14 | Δ |
| E14/E14-A | 1.3 | 363 | 58 | 0.16 | ○ |

As the analytical results shown in Tables 1 and 3, since the electrolytic copper foils of E10 to E14 were free from wrinkles, all of the concerned copper-clad laminates could pass the peel strength test II; that is, it demonstrated that the copper-clad laminates comprising the electrolytic copper foils of E10 to E14 indeed had a good adhesion to the dielectric materials of the resin substrate.

Furthermore, from the comparison results of the peel strengths of Examples 10-A to 14-A, since the aspect ratios of surface profile of the electrolytic copper foils 10, 11 and 14 were within the range of 30 to 400, and even the aspect ratios of surface profile of the electrolytic copper foils 10 and 11 were within the range of 35 to 100, the resulting copper-clad laminates of Examples 10-A, 11-A and 14-A had a higher peel strength. It could be explained that when the surface of an electrolytic copper foil has an aspect ratio of surface profile within the above range, the surface can provide a better anchoring effect, thereby providing a higher adhesion of the surface of the electrolytic copper foil to the dielectric materials. On the one hand, if the aspect ratio of surface profile was too low (e.g. 14), said surface may have a deeper valley (i.e., Rq was too high), thereby causing the attached material such as the resin substrate to fail to fill the valley. As a result, an improvement in adhesion would be less obvious. On the other hand, if the aspect ratio of surface profile was too high ((e.g. 693), the degree of unevenness of the surface was shallower (i.e., Rq was too small), and an improvement in adhesion was thereby also less obvious.

Based on the above results in Tables 1 to 3, the technical means of the instant disclosure can effectively reduce or even avoid the occurrence of wrinkles on the surface of the electrolytic copper foils by controlling the range of the Charpy impact strength of the electrolytic copper foils, thereby realizing an improvement in the yield of making the electrolytic copper foil. Moreover, the technical means of the instant disclosure can provide the electrolytic copper foil a better adhesion in subsequent applications, thereby prolonging the life of the resulting product.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. An electrolytic copper foil comprising a base copper layer; wherein a Charpy impact strength of the electrolytic copper foil ranges from 0.4 J/mm² to 5.8 J/mm².

2. The electrolytic copper foil of claim 1, wherein the Charpy impact strength of the electrolytic copper foil ranges from 0.5 $J/mm^2$ to 5.3 $J/mm^2$.

3. The electrolytic copper foil of claim 1, wherein the electrolytic copper foil has two opposite surfaces; wherein at least one of the two surfaces of the electrolytic copper foil has an aspect ratio of surface profile from 14 to 693; the aspect ratio of surface profile is a ratio of a mean width of the roughness profile elements (RSm) to a root mean square deviation of the roughness profile (Rq).

4. The electrolytic copper foil of claim 3, wherein the aspect ratio of surface profile ranges from 37 to 506.

5. The electrolytic copper foil of claim 3, wherein the RSm ranges from 9 μm to 523 μm.

6. The electrolytic copper foil of claim 3, wherein the Rq ranges from 0.14 μm to 1.34 μm.

7. The electrolytic copper foil of claim 3, wherein the Rq ranges from 0.16 μm to 1.25 μm.

8. The electrolytic copper foil of claim 1, wherein the base copper layer has a drum side and a deposited side opposite the drum side, and the electrolytic copper foil further comprises at least one surface-treated layer formed on at least one of the drum side and the deposited side of the base copper layer.

9. The electrolytic copper foil of claim 8, wherein the at least one surface-treated layer comprises an anti-corrosion layer.

10. The electrolytic copper foil of claim 8, wherein the at least one surface-treated layer comprises a nodule treated layer.

11. The electrolytic copper foil of claim 10, wherein the at least one surface-treated layer further comprises at least one sub-layer formed on the nodule treated layer; and the at least one sub-layer is selected from the group consisting of: a copper covering layer, a nickel layer, a zinc layer, a chromium layer, and a silane coupling layer.

12. The electrolytic copper foil of claim 8, wherein the at least one surface-treated layer comprises a first surface-treated layer and a second surface-treated layer, which are respectively formed on the drum side and the deposited side of the base copper layer.

13. The electrolytic copper foil of claim 3, wherein the base copper layer has a drum side and a deposited side opposite the drum side, and the electrolytic copper foil further comprises at least one surface-treated layer formed on at least one of the drum side and the deposited side of the base copper layer.

14. The electrolytic copper foil of claim 13, wherein the at least one surface-treated layer comprises an anti-corrosion layer.

15. The electrolytic copper foil of claim 13, wherein the at least one surface-treated layer comprises a nodule treated layer.

16. The electrolytic copper foil of claim 15, wherein the at least one surface-treated layer further comprises at least one sub-layer formed on the nodule treated layer; and the at least one sub-layer is selected from the group consisting of: a copper covering layer, a nickel layer, a zinc layer, a chromium layer, and a silane coupling layer.

17. An electrode for a lithium ion battery comprising the electrolytic copper foil of claim 1, at least one binder, and at least one active substance.

18. A copper-clad laminate comprising the electrolytic copper foil of claim 1 and a resin substrate.

* * * * *